US012770008B2

(12) United States Patent
Aarabi

(10) Patent No.: US 12,770,008 B2
(45) Date of Patent: Oct. 20, 2026

(54) SYSTEM AND METHOD FOR MEDIA SELECTION BASED ON CLASS EXTRACTION FROM TEXT

(71) Applicant: Parham Aarabi, Toronto (CA)

(72) Inventor: Parham Aarabi, Toronto (CA)

(73) Assignee: PRE INC., Toronto (CA)

( * ) Notice: Subject to any disclaimer, the term of this patent is extended or adjusted under 35 U.S.C. 154(b) by 1289 days.

(21) Appl. No.: 17/670,134

(22) Filed: Feb. 11, 2022

(65) Prior Publication Data

US 2022/0269947 A1 Aug. 25, 2022

Related U.S. Application Data

(60) Provisional application No. 63/153,930, filed on Feb. 25, 2021.

(51) Int. Cl.

| | |
|---|---|
| ***G06N 3/084*** | (2023.01) |
| ***H04N 21/25*** | (2011.01) |
| ***H04N 21/845*** | (2011.01) |

(52) U.S. Cl.

CPC ........... *G06N 3/084* (2013.01); *H04N 21/251* (2013.01); *H04N 21/8456* (2013.01)

(58) Field of Classification Search

CPC ........ G06N 3/084; G06N 3/0895; G06N 3/02; G06N 3/04; G06N 3/08; H04N 21/251; H04N 21/8456; G06F 40/30

See application file for complete search history.

(56) References Cited

U.S. PATENT DOCUMENTS

| | | | |
|---|---|---|---|
| 8,204,749 | B2 | 6/2012 | Hakkani-Tur et al. |
| 8,412,530 | B2 | 4/2013 | Pereg et al. |
| 9,213,687 | B2 | 12/2015 | Au |
| 9,690,767 | B2 | 6/2017 | Leydon et al. |
| 9,864,743 | B2 | 1/2018 | Srinivasan et al. |
| 10,311,143 | B2 | 6/2019 | Fitterer et al. |
| 10,622,007 | B2 | 4/2020 | Bromand et al. |

(Continued)

FOREIGN PATENT DOCUMENTS

| | | |
|---|---|---|
| AU | 2015301869 B2 | 2/2018 |
| CN | 103995803 B | 8/2014 |

OTHER PUBLICATIONS

Jacob Devlin BERT: Pre-training of Deep Bidirectional Transformers for Language Understanding, Jun. 2-Jun. 7, 2019, Proceedings of NAACL-HLT 2019, pp. 4171-4186 (Year: 2019).*

(Continued)

*Primary Examiner* — Mariela Reyes

(57) ABSTRACT

Methods and systems are provided for providing media to a user based on a feature extracted from an input of the user. A communication interface receives the input from the user. Memory is provided for storing a neural network model, media objects and training data, the training data including a first training dataset and a second training dataset. The neural network model is trained in a pre-training step with the first training dataset and is followed by a fine-tuning step with the second training dataset to obtain a multi-layer neural network. Input is provided to the multi-layer neural network to obtain a classification vector. Based on the classification vector, one or more media objects are selected for delivery to the user through the communication interface.

20 Claims, 4 Drawing Sheets

(56) References Cited

U.S. PATENT DOCUMENTS

| | | | | |
|---|---|---|---|---|
| 2012/0016824 | A1* | 1/2012 | Kalinkin | G01M 15/14 706/12 |
| 2015/0066479 | A1* | 3/2015 | Pasupalak | G06F 16/90332 704/9 |
| 2019/0122119 | A1* | 4/2019 | Husain | G06N 3/086 |
| 2020/0021866 | A1* | 1/2020 | Koumchatzky | H04N 21/251 |
| 2020/0193206 | A1* | 6/2020 | Turkelson | H04N 25/00 |
| 2020/0394511 | A1* | 12/2020 | Kasai | G06N 3/044 |
| 2021/0117803 | A1* | 4/2021 | Husain | G06N 3/082 |
| 2021/0326751 | A1* | 10/2021 | Liu | G06F 18/24 |

OTHER PUBLICATIONS

Pier Luca Lanzi, Fast Feature Selection with Genetic Algorithms: A Filter Approach, IEEE, 1997 (Year: 1997).*

Adoma et al., Recognizing Emotions from Texts using a BERT-Based Approach,, Nov. 2020, https://www.researchgate.net/publication/346443403.

Devlin et al., BERT: Pre-training of Deep Bidirectional Transformers for Language Understanding, Proceedings of NAACL-HLT 2019, Jun. 2-Jun. 7, 2019, pp. 4171-4186, 2019 Association for Computational Linguistics, Minneapolis, Minnesota.

Lan et al., Albert: A Lite BERT for Self-supervised Learning of Language Representations, Feb. 9, 2020, https://arxiv.org/pdf/1909.11942.pdf, https://doi.org/10.48550/arXiv.1909.11942.

Lee et al., Fusion-ConvBERT: Parallel Convolution and BERT Fusion for Speech Emotion Recognition, Sensors 2020, Nov. 23, 2020, pp. 1-19, 20(22), 6688, https://doi.org/10.3390/s20226688,, https://www.mdpi.com/1424-8220/20/22/6688.

Young et al., Recent Trends in Deep Learning Based Natural Language Processing, Nov. 25, 2018, https://doi.org/10.48550/arXiv.1708.02709, https://arxiv.org/pdf/1708.02709.pdf.

* cited by examiner

SYSTEM AND METHOD FOR MEDIA SELECTION BASED ON CLASS EXTRACTION FROM TEXT

REFERENCE TO RELATED APPLICATION

This application claims priority from U.S. Patent Application No. 63/153,930 filed on Feb. 25, 2021 entitled "A SYSTEM AND METHOD FOR MEDIA SELECTION AND EMOTION EXTRACTION FROM TEXT". This application claims the benefit under 35 U.S.C. § 119 of U.S. Patent Application No. 63/153,930 filed on Feb. 25, 2021 entitled "A SYSTEM AND METHOD FOR MEDIA SELECTION AND EMOTION EXTRACTION FROM TEXT" which is incorporated herein by reference in its entirety for all purposes.

TECHNICAL FIELD

The present disclosure relates generally to systems and methods for selecting and delivering media objects based on features extracted from text.

BACKGROUND

Computers are often used to facilitate human interactions or to interact dynamically with humans. However, computers are limited in their ability to detect and respond to emotion. When conversing with chatbots or other computer generated responses, a person may recognize the computer as appearing to be responsive to emotion but not truly capable of providing an accurate response to the person's emotional state. This limitation can lead to unnatural or poor interactions between computers and humans.

There is a general desire to address such limitations in order to improve human and computer interaction. There remains a need for systems that can be trained or otherwise configured to accurately recognize emotions expressed by a user. There also remains a need for systems that can select or otherwise provide a suitable response (e.g., a video response, a text response, an audio response, etc.) based on the recognized emotions.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

According to an aspect of the present disclosure, a computer-implemented method for providing media to a user is provided. The media is provided to the user based on features extracted from an input of the user. The method involves receiving through a communication interface the input from the user, providing the input to a multi-layer neural network to obtain a classification vector, and selecting media objects for delivery to the user based on the classification vector. The multi-layer neural network is trained in a pre-training step with an unlabeled training dataset. This is followed by a fine-tuning step with a labeled training dataset. The labeled dataset includes data tagged with one or more classes of the feature. The classification vector may have one or more entries, each one of the one or more entries corresponding to a class of the feature. The labeled training dataset may be smaller than the unlabeled training dataset. The input may be a text string.

In some embodiments, the pre-training step includes bidirectional training by applying a missing words mask to the unlabeled dataset. In some embodiments, the pre-training step includes training through sentence prediction. In some embodiments, the fine-tuning step includes training through back-propagation. In some embodiments, the fine-tuning step is preceded by or includes a genetic training step. In the genetic training step, the labeled dataset is distilled to obtain a subset of the labeled dataset, and the subset is used for fine-tuning the pre-trained neural network model. The genetic training step may include the steps of: initializing a genetic training data vector comprising data selected by the labeled dataset, obtaining an average validation accuracy measurement of the genetic training data vector, and generating one or more new genetic training data vectors based on the average validation accuracy measurement.

In some embodiments, the media objects include video segments that are combinable into a dynamic video response for delivery to the client computer. In some embodiments, the features extracted from the input are emotions and the classification vector is adapted for classifying the emotions.

According to another aspect of the present disclosure, a non-transitory computer-readable medium comprises instructions that are executable by a processor to perform the computer-implemented methods described herein.

According to another aspect of the present disclosure, a system for providing media to a user is provided. The media is provided to the user based on features extracted from input of the user. The system comprises a communication interface, memory storage, and a processor. The communication interface is for receiving an input of the user from a client computer. The memory storage stores a neural network model, a plurality of media objects and training data including an unlabeled training dataset and a labeled training dataset. The processor is configured to train the neural network model using the training data to obtain a multi-layer neural network, the multi-layer neural network trained in a pre-training step with the unlabeled training dataset and fine-tuned with the labeled training dataset. The processor provides the input to the multi-layer neural network to obtain a classification vector, and based on the classification vector, selects one or more of the plurality of media objects for delivery to the user.

In addition to the exemplary aspects and embodiments described above, further aspects and embodiments will become apparent by reference to the drawings and by study of the following detailed descriptions.

BRIEF DESCRIPTION OF THE DRAWINGS

Features and advantages of the embodiments of the present invention will become apparent from the following detailed description, taken with reference to the appended drawings in which.

DETAILED DESCRIPTION

The description, which follows, and the embodiments described therein, are provided by way of illustration of examples of particular embodiments of the principles of the present invention. These examples are provided for the purposes of explanation, and not limitation, of those principles and of the invention.

Figure 1:
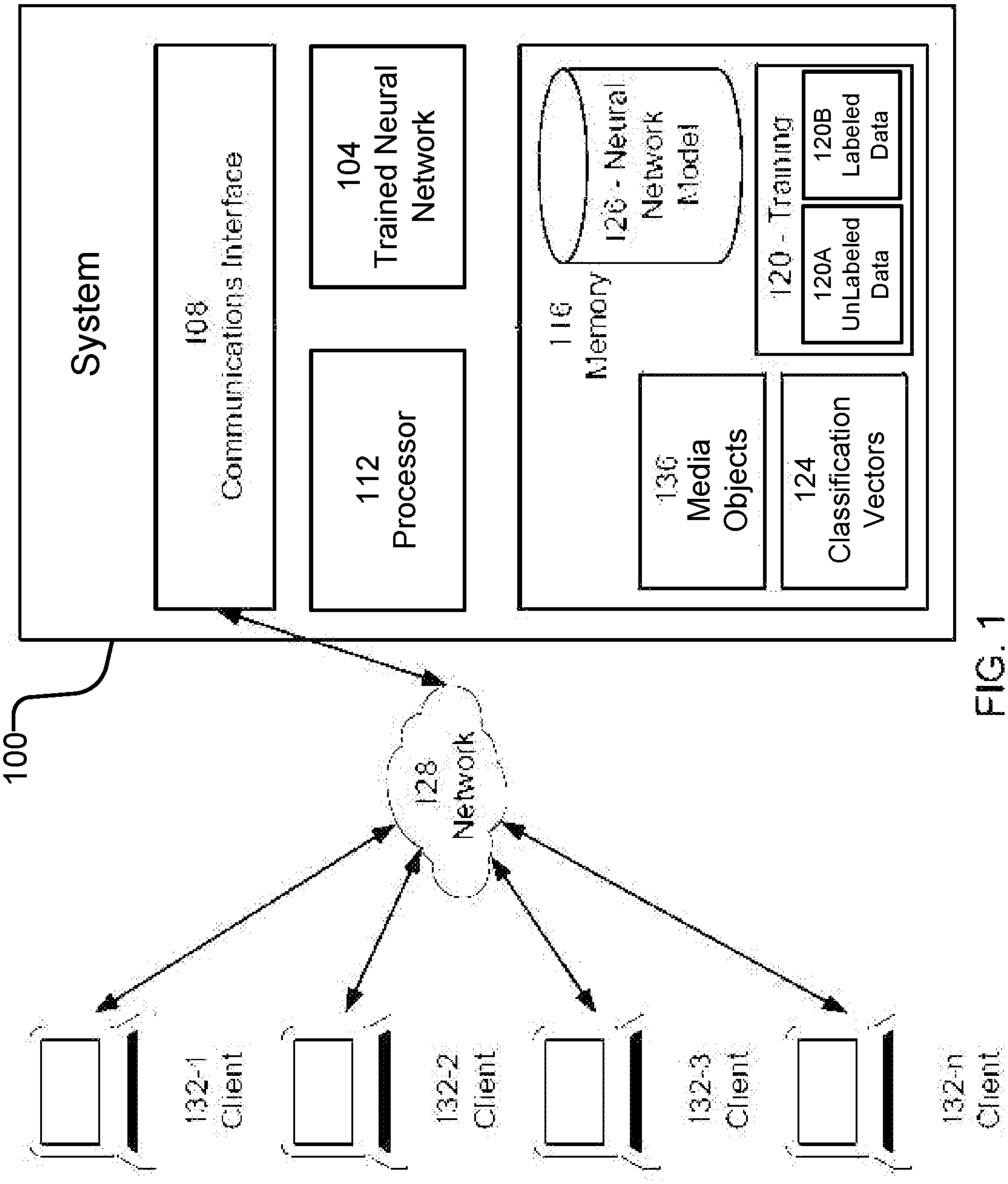
FIG. 1 is a block diagram of an example embodiment of a system that may be used to extract emotion from text input using a trained multi-layer neural network.

FIG. 1 depicts an example embodiment of a system 100 for selecting and delivering a media object (e.g., a picture, a video, music, etc.) based on features or characteristics (e.g., emotion, age, education level, or other demographic information) extracted from an input such as a text input. A feature may be identified using classes (e.g., the emotion feature may be characterized by different classes of emotions like anger, happiness, sadness, etc.). System 100 includes multi-layer neural network 104, communications interface 108, processor 112, and memory 116. Trained multi-layer neural network 104 is configured to extract or otherwise determine one or more features of interest from the input. As described in more detail below, multi-layer neural network 104 may be trained in a two-step process involving a first step of pre-training and a second step of fine-tuning. System 100 may be implemented by a server that includes a server processor, a server memory storing instructions executable by the system processor, a system communications interface, input devices, and output devices.

Communications interface 108 comprises electronics that allow system 100 to connect to other devices such as client computers 132. Communications interface 108 can also connect system 100 to input and output devices (not shown) via another computing device. Examples of input devices include, but are not limited to, a keyboard and a mouse. Examples of output devices include, but are not limited to, a display showing a user interface. The input and/or output devices can be local to system 100 and connect directly to processor 112, or input and/or output devices can be remote to system 100 and which connect to system 100 through another computing device via communications interface 108.

Processor 112 can train and instruct multi-layer neural network 104 to determine the features of interest from the input. Processor 112 can also, based on the features of interest, select a media object 136 and/or generate a new dynamic video response. Media objects 136 may include any combination of video segments (e.g., pre-recorded video clips of family member or friends providing audiovisual responses), audio clips, transcripts, letters, text strings, videos, or other forms of potential conversational correspondence.

Memory 116 stores media objects 136, neural network model 126, training datasets 120, and data generated from neural network 104 (e.g., classification vectors 124) as described in more detail below. Memory 116 includes a non-transitory computer-readable medium that may include volatile storage, such as random-access memory (RAM) or the like, and may include non-volatile storage, such as a hard drive, flash memory, or the like.

As depicted in FIG. 1, system 100 may be in communication with at least one client computer 132 through a network 128. Client computers 132-1, 132-2, 132-3 . . . **132-*n* are referred to herein individually as client computer 132 and collectively as client computers 132. Client computer 132 can provide a graphical user interface (GUI) or a front-end for users to provide inputs (e.g., text, voice, video, etc.) to system 100. Client computers 132 transmit inputs provided by users to system 100 and/or receive outputs (e.g., a media object) from system 100. Client computer 132 may display the output received from system 100 to the user in some cases. Client computers 132 may include desktop computers, laptop computers, servers, or any other suitable device operable by users to provide inputs. Client computers 132 may also include mobile computing devices, such as tablets, smart phones, smart watches, or the like. An example client computer 132 may include a processor, a memory storing instructions executable by the processor, a communications interface, input devices, and output devices. Although not necessary, client computers 132 can form a part of system 100** in some cases.

Client computers 132 are connected directly or indirectly to multi-layer neural network 104 of system 100 via network 128. Network 128 can include any one or any combination of: a local area network (LAN) defined by one or more routers, switches, wireless access points or the like, any suitable wide area network (WAN), cellular networks, the internet, or the like. Although not necessary, network 128 can form a part of system 100 in some cases. For example, system 100 may comprise its own dedicated network 128.

Figure 2:
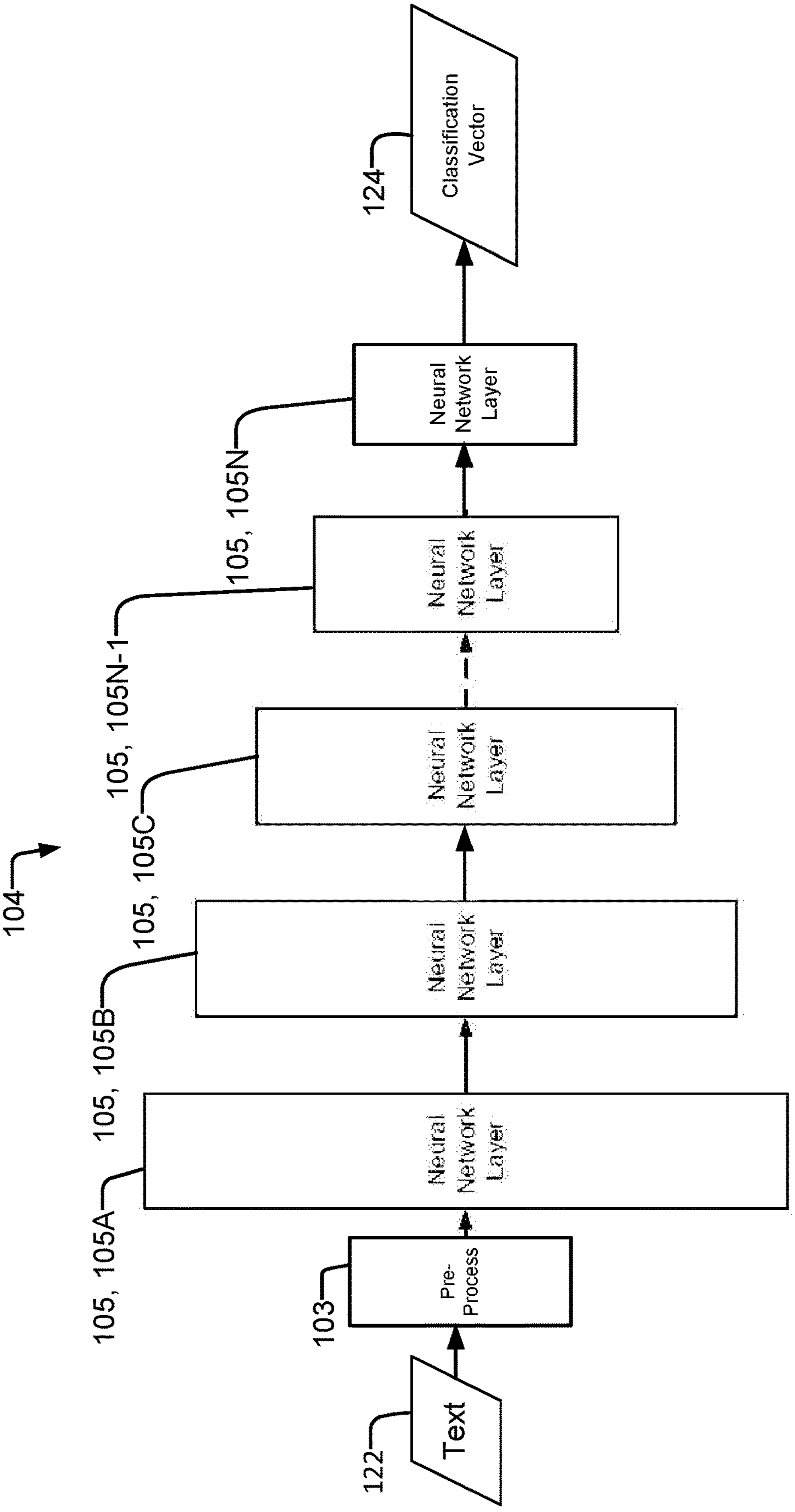
FIG. 2 is a block diagram of an example embodiment of a trained multi-layer neural network of the FIG. 1 system.

FIG. 2 is a block diagram of a multi-layer neural network 104 according to an example embodiment of the invention. Neural network 104 may be implemented by memory 116 and processor 112 of system 100, or dedicated hardware such as graphical processing units (GPUs), hardware accelerators, etc. Neural network 104 comprises neural network layers 105A, 105B, . . . , 105N, including an input layer 105A, intermediate layers 1056, 105C, . . . , 105N-1, and an output layer 105N. Each neural network layer 105 comprises its own respective nodes (not shown) that are configured to perform computations in parallel with one another (e.g., weighted summation, multiplication by an activation function, etc.). Neural network 104 may also comprise a pre-processing module 103 for converting an input such as text 122 into a suitable form for processing at layer 105A.

Neural network 104 is trained in a two-step process. The two-step process may involve a first step of pre-training on a relatively large dataset to obtain a natural language (NLP) model and a second step of fine-tuning on a relatively small dataset to obtain the final classifier model. For brevity, the first step may also be referred to herein as "pre-training" and the second step may also be referred to herein as "fine-tuning". As described in more detail below, pre-training may be performed using a large corpus of unlabeled text to understand language. Fine-tuning may be performed using labeled text (e.g., text with an associated classification feature such as emotion expressed as a vector) to understand the relation between the language and certain features of interest (e.g., emotion).

By combining pre-training with fine-tuning, neural network 104 may be trained to form some layers 105 that mostly learn a language model and other layers 105 that mostly act as a classifier. Namely, trained neural network 104 may include a first set of layers 105 configured to implement primarily a language model and a second set of layers 105 configured to implement primarily a classifier. In some embodiments, the intermediate layers 105B, 105N-1 of neural network 104 can include layers 105 from both the first set and the second set. Illustratively, applying language model 105 towards the task of classification in accordance with methods described herein allows trained neutral network 104 to extract feature(s) of interest from an input in a more accurate manner and/or to extract feature(s) of interest from a wider variety of inputs.

In some embodiments, neural network 104 is trained or otherwise configured to receive input text 122, extract features of interest from input text 122, and output the extracted features of interest. To extract features of interest from text 122, trained neural network 104 may perform, at a pre-processing module 103, one or more of: tokenizing text 122 (e.g., splitting text 122 to words), adding one or more tokens to text 122 (e.g., at the beginning and/or end of a sentence), encoding the tokenized text 122 into a numerical representation, and inputting the numerical representation of text 122 to first layer 105A of neural network 104. For example, pre-processing module 103 may tokenize and convert input text 122 into a numeric vector and the numeric vector may then be inputted to first layer 105A of neural network 104. Such numeric vectors may have a length corresponding to the number of nodes of input layer 105A.

In some embodiments, trained neural network 104 is configured to extract or otherwise determine emotion from input text 122. In such embodiments, neural network 104 may be trained or otherwise configured to output a classification vector 124 characterizing an emotional state inferred from input text 122. Classification vector 124 may comprise an array of numbers, with each number representing the state of a particular emotion (i.e., where the state may be considered a class of emotion). For example, neural network 104 may be trained to output a classification vector 124 having six elements corresponding to the following classes of emotions [Angry, Scared, Happy, Sad, Worried, Uncertain]. In such embodiments, neural network 104 may, for example, in response to a text input 122 of "That person pisses me off" output a classification vector 124 of [1, 0, 0, 0, 0, 0].

The output classification vector 124 may be stored in memory 116 of system 100 for further processing. For example, processor 112 may select suitable media objects 136 for presentation to a user based on classification vector 124. Processor 112 may implement any suitable algorithm for selecting media objects 136 based on classification vector 124. For example, media objects 136 may comprises one or more tags corresponding to a feature (e.g., emotion) described by classification vector 124, and processor 112 may select a media object 136 having a tag that matches the most prominent feature identified by classification vector 124. The selection of media object 136 based on the classification vector 124 may be performed randomly (e.g. where the prominent feature identified from the input is the class of emotion corresponding to sadness, a media object 136 may be selected randomly from a set of media objects that are tagged with this class). Alternately, selection of media object 136 based on the classification vector 124 may be performed systematically, in accordance with an algorithm that takes into account features identified from the input and other information.

In some embodiments, neural network 104 is trained or otherwise configured to output classification vectors 124 containing numbers that add up to 1. In such embodiments, classification vector 124 can represent a varying mixture of emotions, quantified as percentages, associated with input text 122.

Figure 3:
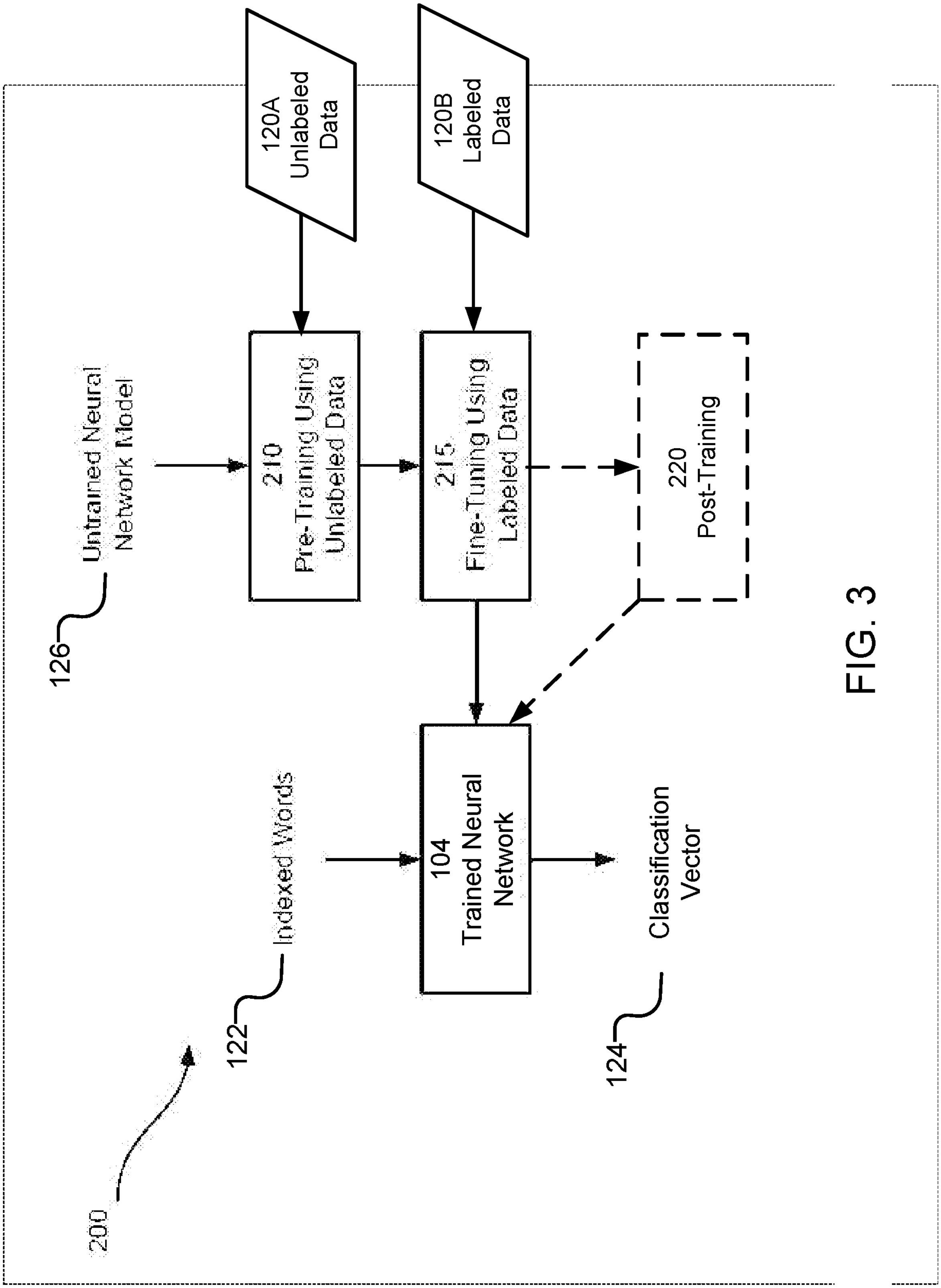
FIG. 3 is a flowchart illustrating an example method of training a neural network model followed by using the trained neural network to obtain a classification vector from text input.

Further aspects of the invention relate to methods of obtaining multi-layer neural network 104 from an untrained neural network model 126. FIG. 3 is a flowchart illustrating an example method 200 of obtaining multi-layer neural network 104 from neural network model 126. Method 200 may be implemented via processor 112 and/or memory 116. Method 200 involves training neural network model 126 using a training dataset 120 comprising both unlabeled data 120A (e.g., text strings without corresponding emotions associated therewith) and labeled data 120B (e.g., text strings with corresponding emotions associated therewith). Training dataset 120 may be developed using a multi-layer bidirectional transformer encoder, or the like. For example, training dataset 120 may be developed using techniques described in "Attention is all you need. In Advances in Neural Information Processing Systems" by Vaswani et al., which is incorporated herein by reference.

In the illustrated embodiment, method 200 comprises obtaining at pre-training step 210 a natural language prediction model. In one example embodiment, such natural language prediction model may be similar to or based on a Bidirectional Encoder Representations from Transformers model described in "Pre-training of deep bidirectional transformers for language understanding" by Devlin, J. et al., which is incorporated herein by reference.

Pre-training step 210 comprises one or more passes at training neural network model 126 using unlabeled data 120A. In a first pass at training in step 210, words from unlabeled training data 120A may be tokenized via a word-to-index convertor or lookup table. First pass training may be performed in a bidirectional fashion by first applying a missing words mask to the unlabeled training data 120, and then training neural network model 126 to predict the missing word in the missing word mask. In some embodiments, the missing word mask is applied by randomly selecting a subset of the unlabeled training data 120A and replacing certain words from the subset with a token. For example, a missing word mask can be applied to the sentence "cold ice cream" to yield "cold______cream", and neural network model 126 may be trained to return the token for the word "ice" when "cold______cream" is inputted to neural network model 126.

In an optional second pass at training in step 210, next sentence prediction can be used. Next sentence prediction involves training neural network model 126 to predict, based on the tokens in a first sentence, the tokens in a following sentence (i.e., a second sentence). For example, next sentence prediction can be applied to the sentence "The weather is cold outside today" (e.g., a sentence from unlabeled data 120A) to train neural network model 126 to return the tokens for the words "bring" and "coat" as part of predicting the second sentence to be "I should bring a coat".

Optionally, pre-training step 210 may comprise or be followed by a pre-filtering step. The optional pre-filtering step involves selecting more robust or more meaningful labeled data 120B and rejecting noisy or erroneous data. The pre-filter step can be performed by going through the data and selecting only the data elements that are determined to be valid in a knowledge distillation step where pre-trained neural network model 126 (a large and complex language model) is distilled. The knowledge distillation may involve using a parent model to teach a smaller student model. Illustratively, the student model may be a simpler model with similar performance and accuracy as compared to the parent model.

After pre-training neural network model 126 with a natural language prediction model in step 210 to obtain language model 105 or portions thereof, method 200 proceeds to a fine-tuning step 215. In a current embodiment, fine-tuning step 215 comprises providing labeled training data 120B to the pre-trained neural network model 126 to further train (i.e., to "fine tune") neural network model 126 using methods such as back-propagation or similar error-based training methods. The amount of labeled training data 120B required can be relatively small compared to the amount of unlabeled training data 120A. Labeled training data 120B includes text strings along with their associated emotions, which may be expressed as a text response or a vector like the classification vector 124. For example, one labeled training data 120B may contain the text string "Things could be going better" and an associated emotion of sadness. In this example, the sadness emotion may be expressed as the vector [0, 0, 0, 1, 0, 0] corresponding to [Angry, Scared, Happy, Sad, Worried, Uncertain].

In some embodiments, step 215 comprises training all of the neural network layers that were pre-trained at step 210. In other embodiments, step 215 comprises training both neural network layers that were pre-trained at step 210 and the additional neural network layers (e.g., neural network layers that were not trained at step 210). Namely, both the pre-trained neural network layers and the additional neural network layers are fine-tuned during step 215 in such embodiments. In other embodiments, step 215 comprises training only the additional neural network layers that were not pre-trained at step 210. Namely, in these embodiments, only the additional neural network layers are fine-tuned in step 215 in such embodiments.

After step 215, the training of multi-layer neural network 104 is complete. Illustratively, multi-layer neural network 104 allows system 100 to extract emotion(s) from a wide variety of text, including text that is not within the vocabulary of the smaller labeled dataset 120B. As an example, the phrase "I had a devastating day" may not be contained in the labeled emotion text dataset 120B. Typical systems would not be capable of identifying an appropriate emotion for such a phrase because they have not been properly trained to recognize such a phrase. However, by first learning language model 105, multi-layer neural network 104 is able to identify closely associated phrases such as "I am having a horrible day", or "I just had the worst day of my life", or "Very bad day!". Since at least one of the closely associated phrases will likely be contained in the labeled emotion dataset 120B, multi-layer neural network 104 will be able to extract an emotion from the phrase "I had a devastating day" and assign a corresponding classification vector 124 thereto (even though this phrase does not exist within the vocabulary of labeled training dataset 120B).

Method 200 may optionally comprise a post-training step 220 for further optimization of trained neural network model 104. In some embodiments, step 220 comprises performing genetic training to determine areas of improvement for trained neural network 104. Illustratively, genetic algorithms can be used to identify areas to perform additional training to increase the accuracy of trained neural network 104.

As an example, trained neural network 104 may be trained to detect different emotions, including "sadness". If all records within training dataset 120 related to the "sadness" emotion were identified and removed from training dataset 120 prior to step 215, then trained neural network 104 will not be proficient at detecting the "sadness" emotion from input 122. If a small subset of records related to "sadness" were added back to training dataset 120 prior to step 215, then trained neural network 104 may be more proficient (but still not fully proficient) at detecting the "sadness" emotion from a input 122.

By genetically searching over the training data 120, a small subset of training data 120 can be isolated, upon which the "sadness" emotion can be identified from this specific training data subset. The information can be used to improve training dataset 120. For example, genetic training can be used to identify which specific training data 120 resulted in a specific output, which may be useful for legal or investigative processes concerned with the specific behavior of a neural network model.

For the purposes of describing the genetic search algorithm, a chromosome C(n) of length N has a binary "1" in location "n" indicating that the corresponding training data 120 is used and a binary "0" indicating that the corresponding training data 120 is not used. The chromosome may C(n) may be applied to training data 120 to determine the least subset of the training data, which, if removed, may alter emotional output for a text string input Q. If a specific training data 120 has been blocked from training by a chromosome whose output has resulted in an outage for the same input Q, then the training data is more likely to have an impact on the specific text input Q. Conversely, if a chromosome whose output has not resulted in a change, then its allowed training data are more likely to have an impact on the specific text input Q.

Step 220 may comprise randomly generating a series of M chromosomes, applying each chromosome to the original training data 120, and training (and/or fine-tuning) neural network model 104 (or a copy of network model 104) on the modified training data. For each chromosome m, a new classification vector V(m) will be extracted at the trained neural network 104 output. For example, an input text string Q may include the phrase "I am not having a good day, my father just passed away", and a new classification vector V(m) will be extracted for each chromosome m.

In some embodiments, step 220 comprises computing an overall fitness function across the chromosomes for a specific training data 120. The computation can be performed using one or more formulas or rules. Assuming that $C_{m(n)}$ is the $m^{th}$ chromosome's $n^{th}$ value, then an example rule may be: If $C_{m(n)}=0$, then if V(m) is different than $V_0$, then training set n should be deemed less fit; If $C_{m(n)}=1$, then if V(m) is similar to $V_0$, then training set n should be deemed more fit. With such an example rule, one computation could be as follows: $W(n)=Sum_m\ [(1-C_{m(n)}*|V(m)-Vo|-C_{m(n)}*|V(m)-Vo|]$, where W (n) is the overall fitness function ($Sum_m$ stands for the summation of the terms in the square bracket "[ . . . ]" over all values of m).

After W(n) is computed for the M chromosomes, step 220 may proceed to subsequent generations. In an example subsequent generation, "M" new chromosomes can be created with the "L" training data with the highest W(n) value having a high probability of being deselected, and other training data with lower W(n) values having a low probability of being deselected. In such example, there is a high probability that $C_{m(n)}=0$ if W(n) is among the "L" highest ones from the previous computation. "L" stands for the number of training data that are selected at each generation to seed the next generation.

For example, for n's with W(n) in the top "L" values, the probability of $C_{m(n)}=0$ is 0.8 for the next generation, and for n's with W(n) that are not in the top "L" values, the probability of $C_{m(n)}=0$ is 0.1 for the next generation. The 0.8 and 0.1 probabilities in the example above can be any value. Once new chromosomes are generated, the impact on input text string Q is computed again, the fitness score W(n) is computed again, and the steps are repeated for the new chromosomes in step 220.

In order to obtain a solution from the genetic algorithm, the value of "L" may be reduced after every generation in some cases. For example, "L" may be N/10 in the first generation, "L" may be N/20 in the second generation, and "L" may be N/40 in the third generation 3, etc.

The generations are repeated with reductions in "L" until no further changes are observed in the output. At this point, the last set of "L" training data which did result in an output change are used as a representation of the smallest set of training data, which if excluded during training may alter a specific output of the neural network. This illustrates that a specific neural network observation is the result of a specific subset of the training data.

Figure 4:
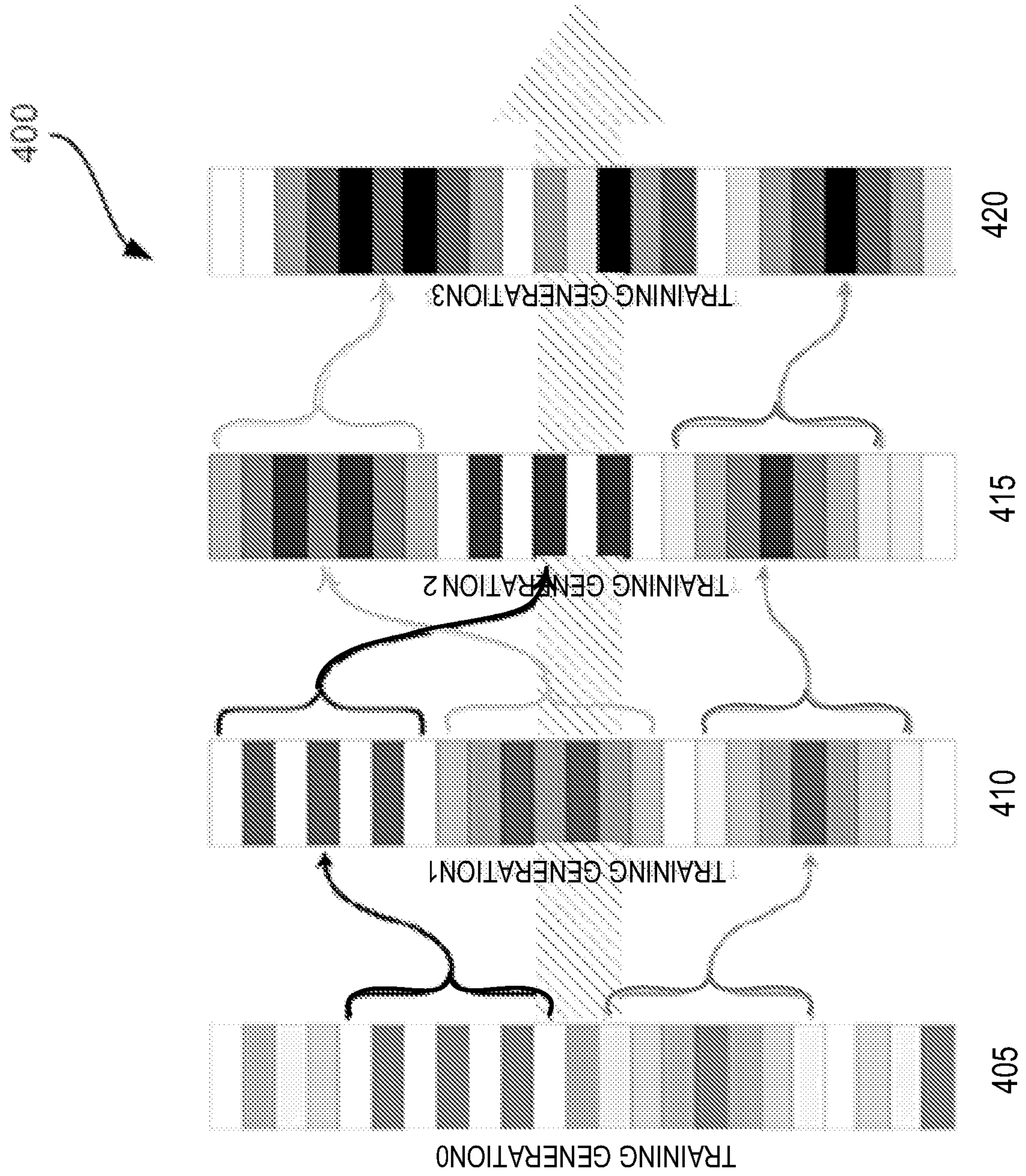
FIG. 4 is a flowchart illustrating how subsets of training data options may be passed onto future training data option generations in a post-training step of the FIG. 3 method.

Referring to FIG. 4, chart 400 illustrates how subsets of training data options are passed onto future training data option generations based on the evaluation of the training data using a fitness function. In FIG. 4, the different levels of gray indicate different training data elements. Training data is combined and passed onto future generations based on the overall fitness of a specific training set. For example, subsets of a specific training set are more likely to be passed on if the training set had a higher fitness result. The different shades of the arrows indicate the combinations of training data when moving from one training generation to the next. Block 405 represents the first training generation. Block 410 represents the second training generation. Block 415 represents the third training generation. Block 420 represents the fourth training generation. The arrows represent training data subsets as they are passed from one generation to the next.

In another embodiment, genetic training is performed during fine-tuning stage 215. In such embodiments, the optional pre-filtering step described above can be achieved by the genetic training. Combined genetic training and fine-tuning step 215 involves generating a series of genetic labeled training data vectors C(n). C(n) is assigned a label "1" in the $n_{th}$ location corresponding to the $n_{th}$ labeled training data 120B being used and a "0" in the $n_{th}$ location corresponding to the $n_{th}$ labeled training data 120B not being used. The labels could be randomly generated and assigned (e.g. 90% of training data 120B assigned with 1's, 10% of training data 120B assigned with 0's) or by other means of initialization of a vector. The genetic training vector C(n) is applied to the labeled training data 120B used during fine-tuning, and the validation accuracy of the fine-tuning (i.e., a measure of the overall accuracy of the classification) is then used as a fitness measure "V" for the genetic training data vector C(n).

In some embodiments, different genetic training data vectors $C_i(n)$ are used to obtain different corresponding fitness measures $V_i$. In such embodiments, step 215 comprises obtaining measurements that reflect the overall impact of a subset of training data on the fine-tuning validation accuracy. One example measurement is the average validation accuracy for each data element A(n), which can be measured as the sum over all i of $C_i(n)*V_i$.

Step 215 may also comprise iterating through all values of "n" to generate new genetic training vectors with the locations with the highest A(n) value having the highest likelihood of being a 1, and locations with the lowest A(n) value having the lowest likelihood of being a 1. By repeating genetic training using the new genetic training vectors, new sets of genetic vector and fitness pairs may be obtained. The new sets of genetic vector and fitness pairs may be used to create a new average validation accuracy for each element A(n), which allows additional new genetic training vectors to be generated.

As the genetic training process is repeated, labeled training data 120B that have highest validation accuracy will lead to higher fitness function values, and will appear more often in the genetic selection vectors C(n). On the other hand, labeled training data 120B that are noisy or unhelpful will lead to lower fitness function values, and will appear less often in the genetic selection vectors. Illustratively, combining genetic training with fine-tuning can result in superior selection of labeled training data 120B and a higher validation accuracy.

Referring back to FIG. 1, trained neural network 104 may be used by system 100 to extract a classification vector 124 from a text input 122. Once classification vector 124 has been extracted from trained neural network 104, processor 112 may select a media object 136 based on classification vector 124. The selected media object 136 can be provided as an output of system 100. For example, the selected media object 136 can be delivered to client computers 132 through communications interface 108 over network 128.

Referring back to FIG. 1, system 100 may be configured to receive an input from client computer 132, extract classification vector 124 from the input, select one or more media objects 136, and transmit the selected media objects 136 to client computer 132. In some embodiments, the input that is received from client computer 132 is a text string. In other embodiments, the input that is received from client computer 132 includes audio and/or video. In such embodiments, system 100 may be configured to convert the received input audio or input video into a text string and provide the text string to trained neural network 104. Alternatively, system 100 may be configured to pre-process (e.g., at pre-processing module 103) audio or video directly and provide a numeric representation of the audio or video to trained neural network 104.

In some embodiments, system 100 is configured to select based on classification vector 124 a single media object 136 (e.g., a single video segment) and to deliver the selected video segment 136 to client computer 132. For example, if trained neural network 104 extracts a classification vector 124 corresponding to the angry emotion, then processor 112 may select a media object 136 that is associated with the angry emotion. This selection can be made via any suitable method or system that accounts for the "angry" emotion. For example, processor 112 can make a random selection from a pool of media objects 136 that are tagged with the "angry" emotion. As another example, processor 112 can select a media object 136 from a set of media objects in accordance with an algorithm taking into account the classification vector 124 and other information, such as the input text string from which the classification vector 124 was extracted. AI models may also be used to select the media object 136 based on the classification vector and other information.

The selected media object 136 may be transmitted to client computer 132 over network 128. From the perspective of a user of client computer 132, the media object 136 will appear to have been played back in a specific or random sequence in response to a user input, thereby resulting in a dynamic video response (or future communications event) that matches the underlying emotional context of the user input. Illustratively, media object 136 may include pre-recorded video clips and system 100 may use of Generative Adversarial Networks for dynamic "deep fake" video generation to be played back to a user based on a classification vector 124.

In some embodiments, system 100 is configured to select multiple media objects 136. In such embodiments, the multiple media objects 136 can be sequenced, combined and then sent to the client computer 132 to create a dynamic video response corresponding to a specific classification vector 124. Such sequenced response can be accomplished by concatenating multiple videos, each of which may have been selected based on a match to a particular detected emotion. In some embodiments, processor 112 is configured to obtain from classification vector 124 the strongest "N" emotions by selecting the highest "N" numbers from emotional state vector 124. For example, if "N" is 3, then up to 3 of the strongest emotions may be obtained from classification vector 124 (i.e., if less than "N" emotions are identified, then only the identified emotions are selected). The 3 strongest emotions may then be sorted in ascending or descending order. Processor 112 may identify corresponding media objects 136 based on the emotions obtained from classification vector 124, and combine the media objects 136 together to create a combined media object for transmission to client computer 132. In addition, in alternate embodiments, the output returned at client computer 132 for the user to experience is not limited to text output, or video, but can also include audio.

The selection of multiple media objects 136, or a single combination of multiple media objects 136, can be accomplished by a multi-class media object selector or the like. The multi-class media object selector may perform a search based on one or more classification results (e.g., emotions of "angry", "sadness", and "frustration") to identify media objects 136 that have tags or keywords that match the multiple classes. This may be accomplished in the following two-step process.

In the first step, the multi-class media object selector is configured to identify a single media object 136 (e.g., video) with tags or keywords matching all the selected classes. If this fails, then in the second step the multi-class media object selector is configured to generate a single combination of available media objects 136 that would match the selected classes. If this cannot be done, then the media object selector is configured to identify or generate media objects 136 that match the largest subset of the selected classes.

Illustratively, the second step of the multi-class media object selector can be accomplished by means such as generative adversarial networks that utilize available media objects 136 (e.g., videos) to generate a new video, or simpler video combination techniques such as sequenced concatenation.

Aspects of the invention may be applied more broadly to applications beyond emotion detection. For example, systems and methods described herein may be use for any application where text is classified, as described in more detail below. In addition, the classification results may be used to select a sequence of media objects 136.

Further aspects of the invention are described with reference to the following example applications, which are intended to be illustrative and not limiting in scope.

In one example application, system 100 is used to provide a unique video combination output in response to a user's emotional query to a loved one. In such applications, a first user (i.e., User "A") records a number of videos corresponding to a series of emotional classes (e.g. happy, sadness, tragedy, anger, etc.). The recorded videos are transmitted to system 100 and stored thereon as media objects 136. Then, a second user (i.e., User "B") who wishes to ask the first user a question submits a query through their user device (e.g., client computer 132). The query is delivered to system 100 and inputted to trained neural network 104 to extract a classification vector 124 as outlined above. The classification vector 124 is then used to select the videos recorded by the first user. Here, the selected videos will be a unique sequence of the first user's videos. As an example, a child may input to their client computer 132 "Mom, I am having such an amazing week. I finally was able to address my problems and worries and start out on a new venture. I am so excited about what lies ahead!", and client computer 132 may return an output including a video of Mom about Excitement, a video of Mom about Hope, and a video of Mom congratulating child.

In another example application, system 100 is used to analyze social media feed and generate news video segments. For example, system 100 may be used to automatically generate financial news. In such applications, system 100 is configured to automatically select social media posts related to one or more financial subjects or assets of interest (e.g., stocks). The selected social media posts are parsed into a text format and inputted to trained neural network 104. The parsed social media posts are classified based on their positive or negative impact on the asset of interest, and based on this, either a positive or negative outlook video for the specific asset of interest is selected. The selected video can be provided to client computers 132. This process can be repeated across multiple financial subjects or assets, thereby providing an automated financial news generator. As an example, a social media post of "I just bought a Tesla, can't believe the autopilot failed and caused an accident. Full self-driving is still a few years away for sure" can result in the selection of a video segment that is cautious about Tesla stock.

In another example application, system 100 is used to provide a sequence of video recommendations based on features extracted from a text input. In such applications, neural network 104 is trained using method 200, or the like, to extract the features of interest from text input. For example, neural network 104 may be trained to extra a color vector from text input. In such example, a user may describe the color and finish of a furniture or item by providing a textual description. Based on the textual description, one or more color classes are inferred. The color classes may then be used by system 100 to select a series of videos of furniture/items that match the inferred color. For example, a user may input "a dark red velvet sofa with a slight hint of blue that slightly shimmers" into an application of client computer 132, and client computer 132 may return a video showcase of dark red chair with a bit of blue, a video showcase of shimmery dark red table with a bit of blue, a video showcase of dark red ottoman with a bit of blue, etc.

In another example application, system 100 is used to provide automated video advertisement based on user product preferences. In such applications, a user provides a description of the features that they are looking for in a product. System 100 receives the description and analyzes the description using trained neural network 104. System 100 selects suitable video segments from media objects 132 and provides the selected video segments as output to form a custom advertisement for the user. These video segments could be, for example, from a spokesperson, a celebrity, etc. Illustratively, a user input of "I would love a red coat that can be worn in any weather, is 100% cotton, is warm enough for Canadian winters, has a thick belt, and lasts a long time" may cause system 100 to return a video of coat that is water proof, a video of coat that is warm, a video of coat that is made of cotton and is warm, etc.

In another example application, system 100 can be used to provide videos of the effects of unique or unusual ingredients in a product. In such applications, a user provides the name of a product from which the description and ingredients (e.g., Ingredient Set #1) are downloaded from a product database. The product description is then analyzed using the trained neural network 104, which has been pre-trained and fine-tuned using a dataset of product descriptions with labeled ingredients. The output of the trained neural network will be a set of ingredients (e.g., Ingredient Set #2). By selecting any outlier ingredients (i.e. ingredients that are included in Ingredient Set #1 but not in Ingredient Set #2), system 100 can be used to provide videos about the effect of these unique or unusual ingredients.

In other example applications, system 100 can be used to provide a video preview based on travel itinerary description, a medical advice video based on a symptom, and instructional videos based on a request. In such example applications, system 100 may comprise a multi-layer neural network 104 that is trained or fine-tuned with labeled datasets 120B that are specific to the feature of interest.

Illustratively, computerized detection of features (e.g., human emotion) from text is more accurate with one or more neural networks trained in accordance with the techniques described herein. By training a neural network model using a training set comprising both unlabeled data and labeled data, the trained neural network may be able to determine human emotions more accurately. By including trained neural networks described herein, systems are able to provide more meaningful interactions with human users. This may help facilitate more natural and engaging conversations between humans and machines.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computer-implemented method for providing media to a user based on a feature extracted from an input of the user, the method comprising:

obtaining a multi-layer neural network comprising a neural network model pre-trained with an unlabeled training dataset;

genetically filtering a labeled dataset to obtain a subset of the labeled dataset, wherein the labeled dataset and the subset each comprise data tagged with one or more classes, wherein the genetic filtering comprises:

initializing a genetic filtering training data vector, the genetic filtering training data vector comprising data selected from the labeled dataset;

obtaining an average validation accuracy measurement of the genetic filtering training data vector by propagating the genetic filtering training data vector through the pre-trained neural network model; and generating one or more new genetic filtering training data vectors based on the average validation accuracy measurement;

fine-tuning the neural network model to increase model accuracy by training the neural network model with the subset of the labeled dataset;

receiving the input through a communication interface;

providing the input to the multi-layer neural network to obtain a classification vector, the classification vector having one or more entries, wherein each of the one or more entries is associated with a class of the feature; and based on the classification vector, selecting one or more media objects from a plurality of media objects for delivery to the user.

2. The method of claim 1, wherein the genetic filtering training data vector indicates, for corresponding labeled data in the labeled data set, whether the corresponding labeled data is selected into the subset of the labeled dataset.

3. The method of claim 1, wherein the labeled training dataset is smaller than the unlabeled training dataset.

4. The method of claim 3 comprising pre-training the neural network model, wherein the pre-training comprises bidirectional training by applying a missing words mask to the unlabeled dataset.

5. The method of claim 4, wherein the pre-training comprises training through sentence prediction.

6. The method of claim 3, wherein the fine-tuning comprises training through back-propagation using the subset of the labeled dataset obtained by the genetic filtering.

7. The method of claim 1, wherein the one or more media objects comprise video segments that are selected by a multi-class media object selector and combined into a dynamic video response for delivery to the user.

8. The method of claim 1, wherein the input is a text string, and wherein the feature extracted from the input is an emotion associated with the text string.

9. A non-transitory computer-readable medium comprising instructions executable by a processor to perform the method of claim 1.

10. A system for providing media to a user based on a feature extracted from an input of the user, the system comprising:

a communication interface for receiving the input of the user;

one or more memory storage for storing a neural network model, a plurality of media objects and training data, the training data comprising an unlabeled training dataset and a labeled training dataset, the labeled dataset including data tagged with one or more classes; and a processor configured to:

train the neural network model using the training data to obtain a multi-layer neural network, the neural network model trained in a pre-training step with the unlabeled training dataset and fine-tuned to increase model accuracy by further training with a subset of the labeled training dataset, the subset of the labeled dataset obtained from the labeled training dataset by genetic filtering, wherein the genetic filtering comprises:

initializing a genetic filtering training data vector, the genetic filtering training data vector comprising data selected from the labeled dataset;

obtaining an average validation accuracy measurement of the genetic filtering training data vector by propagating the genetic filtering training data vector through the pre-trained neural network model; and generating one or more new genetic filtering training data vectors based on the average validation accuracy measurement;

provide the input to the multi-layer neural network to obtain a classification vector, the classification vector having one or more entries, wherein each of the one or more entries is associated with a class of the feature; and based on the classification vector, select one or more of the plurality of media objects for delivery to the user.

11. The system of claim 10, wherein the genetic filtering training data vector indicates, for corresponding labeled data in the labeled data set, whether the corresponding labeled data is selected into the subset of the labeled dataset.

12. The system of claim 10, wherein the labeled training dataset is smaller than the unlabeled training dataset.

13. The system of claim 12, wherein the pre-training step comprises bidirectional training by applying a missing words mask to the unlabeled dataset.

14. The system of claim 13, wherein the pre-training step further comprises training through sentence prediction.

15. The system of claim 12, wherein the fine-tuning of the neural network model comprises training through back-propagation using the subset of the labeled dataset obtained by the genetic filtering.

16. The system of claim 10, wherein the media objects comprise video segments that are combinable into a dynamic video response for delivery to the user.

17. The system of claim 10, wherein the input is a text string, and wherein the feature extracted from the input is an emotion associated with the text string.

18. A computer-implemented method for communicating with a user in response to a detected emotional state of the user, the method comprising:

obtaining an input text string from input provided by the user;

providing the input text string to a multi-layer neural network to obtain a classification vector representing the detected emotional state of the user, the multi-layer neural network obtained by training a neural network model with a first dataset and fine-tuning the neural network model with a second dataset to increase model accuracy, the second dataset comprising data tagged with one or more classes of emotion, wherein the second dataset comprises a subset of a labelled dataset, the subset obtained from the labelled dataset by genetic filtering, wherein the genetic filtering comprises:

initializing a genetic filtering training data vector, the genetic filtering training data vector comprising data selected from the labeled dataset;

obtaining an average validation accuracy measurement of the genetic filtering training data vector by propagating the genetic filtering training data vector through the pre-trained neural network model; and generating one or more new genetic filtering training data vectors based on the average validation accuracy measurement;

based on the classification vector, selecting one or more media objects from a library of media objects; and communicating the selected one or more media objects to the user.

19. The non-transitory computer-readable medium of claim 9, wherein the genetic filtering training data vector comprises a binary value associated with each of the plurality of labeled data items in the labeled data set, the binary value indicating whether the corresponding labeled data is selected into the subset of the labeled dataset.

20. The method of claim 18, wherein the fine-tuning of the neural network model comprises training through back-propagation using the subset of the labeled dataset obtained by the genetic filtering.

* * * * *